United States Patent [19]
Holland

[11] 3,721,402
[45] March 20, 1973

[54] MISSILE ROLL CONTROL MECHANISM

[75] Inventor: Thomas M. Holland, Orlando, Fla.

[73] Assignee: The United States of America as represented by the Secretary of the Army

[22] Filed: June 25, 1971

[21] Appl. No.: 156,627

[52] U.S. Cl. .................244/3.22, 60/229, 137/119
[51] Int. Cl. ...........................F41g 7/00, G05d 11/00
[58] Field of Search ....244/3.22; 137/119; 60/35, 54, 60/229

[56] References Cited

UNITED STATES PATENTS

| 3,128,602 | 4/1964 | Salemka | 60/35.54 |
| 3,121,440 | 2/1964 | Heller | 60/35.54 |
| 3,115,887 | 12/1963 | McCorkle | 137/82 |
| 3,190,069 | 6/1965 | Gorbaty | 60/35.54 |

Primary Examiner—Benjamin A. Borchelt
Assistant Examiner—James M. Hanley
Attorney—Harry M. Saragovitz et al.

[57] ABSTRACT

A mechanism for controlling the roll of a missile in flight by selective operation of a pair of missile thrusters. Each thruster has a valve to control the flow of gas thereto. The operation of one of the valves is controlled by a pilot valve and operation of the other valve is controlled by pressure feedback from operation of the first thruster.

4 Claims, 3 Drawing Figures

PATENTED MAR 20 1973 3,721,402

Thomas M. Holland,
INVENTOR.

BY Harry M. Saragovitz
Edward J. Kelly
Herbert Berl
Charles R. Carter

MISSILE ROLL CONTROL MECHANISM

BACKGROUND OF THE INVENTION

This invention relates to fluid control valves. All known prior art has required complex systems involving the use of a solenoid and pilot valve for the control of each thruster.

SUMMARY OF THE INVENTION

The present invention reduces the complexity of previous systems by using one solenoid and one pilot valve to control operation of the first thruster. Operation of the second thruster is controlled by a pressure feedback from the first thruster thereby eliminating the necessity of a second solenoid and pilot valve.

DESCRIPTION OF THE PREFERRED EMBODIMENT

Figure 1:
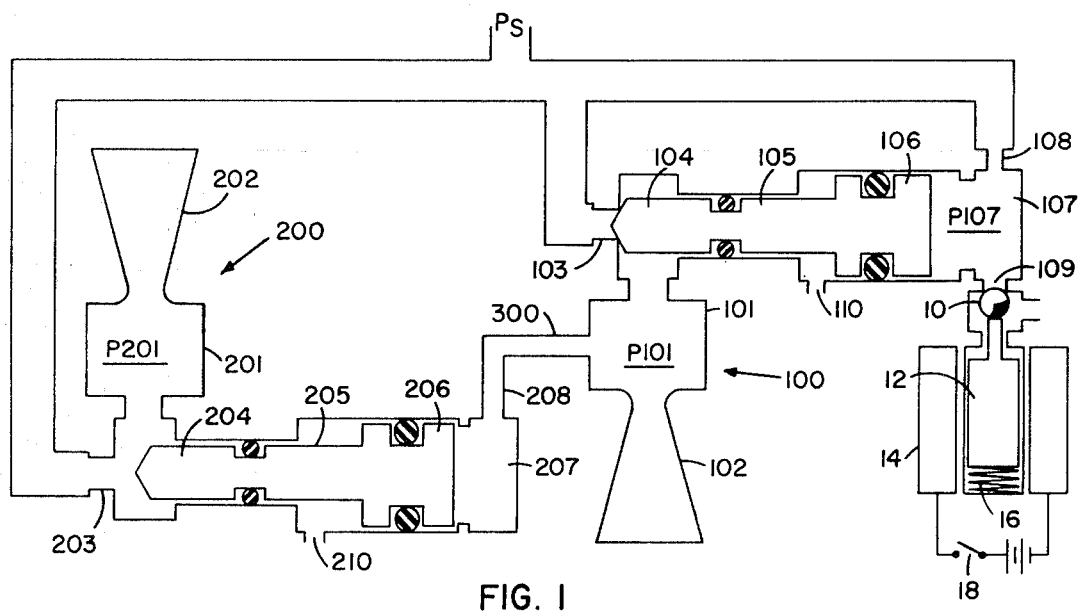
FIG. 1 is a schematic of the components of the mechanism.
Figure 2:
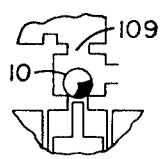
FIG. 2 is a partial view showing the energized position of the pilot valve.

In FIG. 1, reference numerals 100 and 200 indicate thrusters of the roll control mechanism and respectively include pressure chambers 101, 201 and nozzles 102, 202 for missile thrust development. Hot gas, under a pressure Ps, is delivered by the missile to the chambers through inlets 103 and 203. The gas flow through these inlets is controlled by valves 104 and 204 respectively mounted on pintles 105 and 205 that in turn are mounted on sealing pistons 106 and 206 for movement in piston chambers 107 and 207. Chamber 107 has an inlet 108 to allow the gas under pressure Ps to enter the chamber and act on piston 106. This chamber also has an outlet 109, controlled by a solenoid operated pilot valve 10, for exiting the gas in the chamber to atmosphere when valve 10 opens outlet 109. Pilot valve 10 is operated by an armature 12 of solenoid 14 and is biased to a closed position by a spring 16 when the solenoid is de-energized. When switch 18 is closed the solenoid is energized and causes valve 10 to open outlet 109. Valve chamber 207 has an inlet 208 on one side of piston 206 to provide a pressure feedback communication through a conduit 300 between chamber 101 and chamber 207. Chambers 107 and 207 have outlets 110 and 210 communicating with atmosphere to prevent the pistons from working against a trapped head pressure.

In operation the roll control mechanism is actuated by hot gases from the missile gas generator thereby supplying gas under pressure Ps to inlets 103, 108 and 203. In the condition when solenoid 12 is deenergized, valve 10 maintains outlet 109 closed and gas enters and remains in chamber 107. The pressure of the gas now changes from Ps to a pressure P107 which is adequate for actuation of piston 106, due to reduced inlet 108, and because the gas expands in chamber 107. Pressure P107 acts on the face area of piston 106 and develops a force that is greater than that developed in opposition thereto on the valve end of pintle 105. The force acting on piston 106 is developed by pressure P107 while the opposing force acting on the valve end of pintle 105 is caused by pressure Ps acting on valve 104 at inlet 103. By design of chamber volume and piston face area in relation to valve face and pintle areas the resulting differential pressure produces a single greater force on the face of the piston 106. This greater force causes piston 106 and valve 104 to shift to the left and seal off gas flow through inlet 103. Pressure P101 now rapidly falls to atmospheric pressure Pa with an attendant elimination of thrust from nozzle 102. As pressure P101 falls off, the pressure feedback force acting on piston 206 is also relieved and supply gas under pressure Ps enters inlet 203 to develop a greater force on valve 204 than the force caused by pressure P101 acting on piston 206. This greater force causes valve 204 and piston 206 to shift to the right allowing gas to flow through inlet 203 into chamber 201 thereby developing a pressure P201 and thrust is now delivered from nozzle 202.

When the solenoid is energized, by closing switch 18, valve 10 allows gas in chamber 107 to exit outlet 109. The size of outlet 109 is greater by design than inlet 108 thereby allowing gas to exit faster than it is entering the chamber. Thus the pressure P107 will fall to a level where the force exerted by the supply pressure Ps through inlet 103 acting on valve 104 is greater than the force developed by P107 acting on piston 106. This greater force causes piston 106 and valve 104 to shift to the right allowing gas to flow through inlet 103 into chamber 101 and thrust is consequently delivered from nozzle 102. Simultaneously pressure P101 acting through feedback line 300 on piston 206 results in a force that is greater than Ps acting on valve 204. This greater force causes piston 206 and valve 204 to shift to the left and seal off gas flow through inlet 203. The chamber pressure P201 rapidly falls to atmospheric pressure Pa with an attendant elimination of thrust from nozzle 202.

Figure 3:
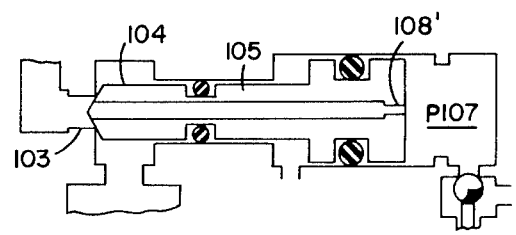
FIG. 3 is a partial view of a second embodiment.

FIG. 3 shows an alternative means for supplying the gas to chamber 107. In this embodiment inlet 108 is placed through the center of pintle 105 and piston 106 and exits into chamber 107. Inlet 108 is also smaller than exit 109 for above reason. This arrangement eliminates the separate gas supply line as used in the first embodiment and operates in the same manner as the above described embodiment.

I claim:

1. A missile roll control mechanism comprising: selectively operated first and second missile thrusters including pressure chambers for producing thrust when gas flow is directed to the selected thruster; a common pressurized gas supply arranged for supplying gas to said thrusters; first valve means disposed to control gas flow to said first thruster; a pilot valve disposed to control movement of said first valve means; second valve means disposed to control gas flow to said second thruster, and means for providing a pressure feedback from said first thruster to said second valve means to control movement thereof, said first and second valve means each including a valve chamber, a piston mounted in each valve chamber for movement therein and a valve mounted on each of said pistons for controlling the gas flow to their respective thrusters, said gas supply including an inlet directly connected to said valve chamber of said first thruster and a gas outlet disposed in said chamber of said first thruster which is controlled by said pilot valve, said second valve chamber of said second thruster includes an inlet connected with said first thrust chamber.

2. A missile roll control mechanism as in claim 1 wherein said first valve chamber pressure inlet is formed through the center of said piston connecting said gas supply to said chamber.

3. A missile roll control mechanism as in claim 2 including an electrical solenoid which when energized causes said pilot valve to open said gas outlet.

4. A missile roll control mechanism as in claim 3 wherein said solenoid operated pilot valve includes a spring for biasing said pilot valve to a closed position thereby closing said gas outlet when said solenoid is de-energized.

* * * * *